(12) United States Patent
Kobayashi

(10) Patent No.: US 6,775,209 B2
(45) Date of Patent: Aug. 10, 2004

(54) OPTICAL DISK APPARATUS AND METHOD OF CONTROLLING MOVEMENT OF OBJECTIVE LENS

(75) Inventor: Toshikazu Kobayashi, Tokyo (JP)

(73) Assignee: Sony Computer Entertainment, Inc., Tokyo (JP)

(*) Notice: Subject to any disclaimer, the term of this patent is extended or adjusted under 35 U.S.C. 154(b) by 388 days.

(21) Appl. No.: 10/043,661

(22) Filed: Jan. 11, 2002

(65) Prior Publication Data

US 2002/0089912 A1 Jul. 11, 2002

(30) Foreign Application Priority Data

Jan. 11, 2001 (JP) ........................................ 2001-003903
Jan. 7, 2002 (JP) ........................................ 2002-000786

(51) Int. Cl.$^7$ ............................................... G11B 7/00
(52) U.S. Cl. ................................. 369/44.29; 369/53.23
(58) Field of Search ...................... 369/44.25, 44.26, 369/44.27, 44.28, 44.29, 44.35, 53.2, 53.23, 53.28, 53.37, 94, 275.3, 53.22

(56) References Cited

U.S. PATENT DOCUMENTS

| | | | |
|---|---|---|---|
| 5,481,517 A | * | 1/1996 | Yoshimoto et al. ...... 369/44.28 |
| 5,903,530 A | | 5/1999 | Tateishi et al. |
| 5,999,503 A | * | 12/1999 | Tateishi et al. .......... 369/44.29 |
| 6,147,942 A | | 11/2000 | Abe et al. |
| 6,633,522 B2 | * | 10/2003 | Ryu ........................ 369/44.29 |

FOREIGN PATENT DOCUMENTS

| | | |
|---|---|---|
| EP | 0 807 926 | 11/1997 |
| EP | 0 919 994 | 6/1999 |
| JP | 11-39663 | 2/1999 |
| JP | 11-149640 | 6/1999 |
| JP | 2000-173065 | 6/2000 |

* cited by examiner

*Primary Examiner*—Paul W. Huber
(74) *Attorney, Agent, or Firm*—Katten Muchin; Zavis Rosenman (57) ABSTRACT

In an optical disk apparatus, a sensitivity adjusting circuit measures a time between a reflection on a surface and a reflection on a recoding layer of an optical disk when moving an objective lens. This time is considered to be in accordance with sensitivity of an actuator during layer jumping, and thereby the magnitudes of a kick pulse and a brake pulse to be applied to the coil of the actuator is increased or decreased in accordance with the time between the reflection on the surface and the reflection on the recording layer. Thereby, the sensitivity dispersion of the actuator of the optical pickup is adjusted.

13 Claims, 7 Drawing Sheets

FIG.7A FOCUS ERROR SIGNAL

FIG.7B APPLIED VOLTAGE — KICK PULSE — BRAKE PULSE

FIG.7C APPLIED VOLTAGE — KICK PULSE — BRAKE PULSE

FIG.7D APPLIED VOLTAGE — KICK PULSE — BRAKE PULSE

OPTICAL DISK APPARATUS AND METHOD OF CONTROLLING MOVEMENT OF OBJECTIVE LENS

FIELD OF THE INVENTION

The present invention relates to an apparatus of driving a multi-layer recording optical disk, more specifically, to technology of adjusting a sensitivity dispersion of an actuator during layer jumping, in which an objective lens is moved in a focusing direction, so as to perform a focus servo operation on an arbitrary recording layer.

BACKGROUND OF THE INVENTION

In recent years, an optical disk called a DVD has been popularized as a large capacity recording medium. The DVD has two recording layers at a maximum in one surface and is capable of recording at both surfaces. In a reproducing apparatus (optical disk apparatus) for such multi-layer recording optical disk, reproduction of a layer may be required while the focus servo operation is performed on the other recording layer which is being reproduced. Therefore, the optical disk apparatus requires a control function (layer jumping function) to control a distance in a focusing direction between the objective lens and the optical disk so that the focus servo operation may be performed on a target layer.

In order to realize the focus servo operation and layer jumping, an actuator is employed in the optical disk apparatus. The actuator functions as a driving mechanism of freely changing a facing direction of the objective lens to the focusing direction, the objective lens converging a laser beam on the recording layer of the optical disk. This actuator is provided to an optical pickup which houses the objective lens.

In the optical pickup, the circumference of the objective lens is provided with a coil portion, which is supported by springs or the like so as to be vertically (in the focusing direction) displaced. In the optical disk apparatus, when layer jumping is conducted at the time of reproducing the optical disk or the like, the focus servo operation is turned off and then a kick voltage is applied to the coil for a predetermined time, so that the objective lens is started to move in a direction of a target layer. When a focal point of the objective lens is moved close to the target layer, a brake voltage is applied to the coil for a predetermined time to stop movement of the objective lens, and then, data reproduction of the target layer is conducted by performing the focus servo operation.

In general, there arises a sensitivity dispersion of the actuator of the optical pickup in the focus direction, and such dispersion is caused by an individual difference of the optical pickup, characteristic changes of the actuator with the elapse of time, and also by change in magnetic force of a magnet caused by environmental changes in temperature, humidity and the like. This sensitivity dispersion of the actuator may cause dispersions of a moving speed and a moving distance of the objective lens in the focusing direction with respect to a kick voltage and a brake voltage applied to the coil of the actuator.

Thus it is desirable to adjust the sensitivity dispersion of the actuator in order to improve stability and convergence in layer jumping.

SUMMARY OF THE INVENTION

An object of the present invention is to provide technology for adjusting the sensitivity dispersion of the actuator in the optical pickup during layer jumping.

In order to solve the problem, according to one aspect of the present invention, there is provided a method of controlling movement of an objective lens in an optical disk apparatus. In the method, a time for moving a focal point of an objective lens between a surface and a recording layer of a multi-layer recording optical disk is measured by moving the objective lens for converging a laser beam in a focusing direction to observe a reflected light from the optical disk while emitting the laser beam to the optical disk. When a recording layer on which the laser beam is to be converged is required to be changed at the time of scanning the optical disk, the objective lens is moved by use of a signal for driving the objective lens toward the recording layer, on which the laser beam is to be converged, and a signal for braking the objective lens. Such signals are separately defined based on a ratio of the measured time and a predetermined reference time.

Further, in order to solve the above problem, according to another aspect of the present invention, there is provided an optical disk apparatus of driving a multi-layer recording optical disk. The optical disk apparatus includes a portion for measuring a time for moving a focal point of an objective lens between a surface and a recording layer of the multi-layer recording optical disk by moving the objective lens for converging a laser beam in a focusing direction to observe a reflected light from the optical disk while emitting the laser beam to the optical disk; and a controlling portion for moving the objective lens by use of a signal for driving the objective lens toward a recording layer on which the laser beam is to be converged and a signal for braking the objective lens, when the recording layer, on which the laser beam is to be converged, is required to be changed at the time of scanning the optical disk. The signals are separately defined based on a ratio of the measured time to a predetermined reference time.

DETAILED DESCRIPTION OF PREFERRED EMBODIMENT

Figure 1:
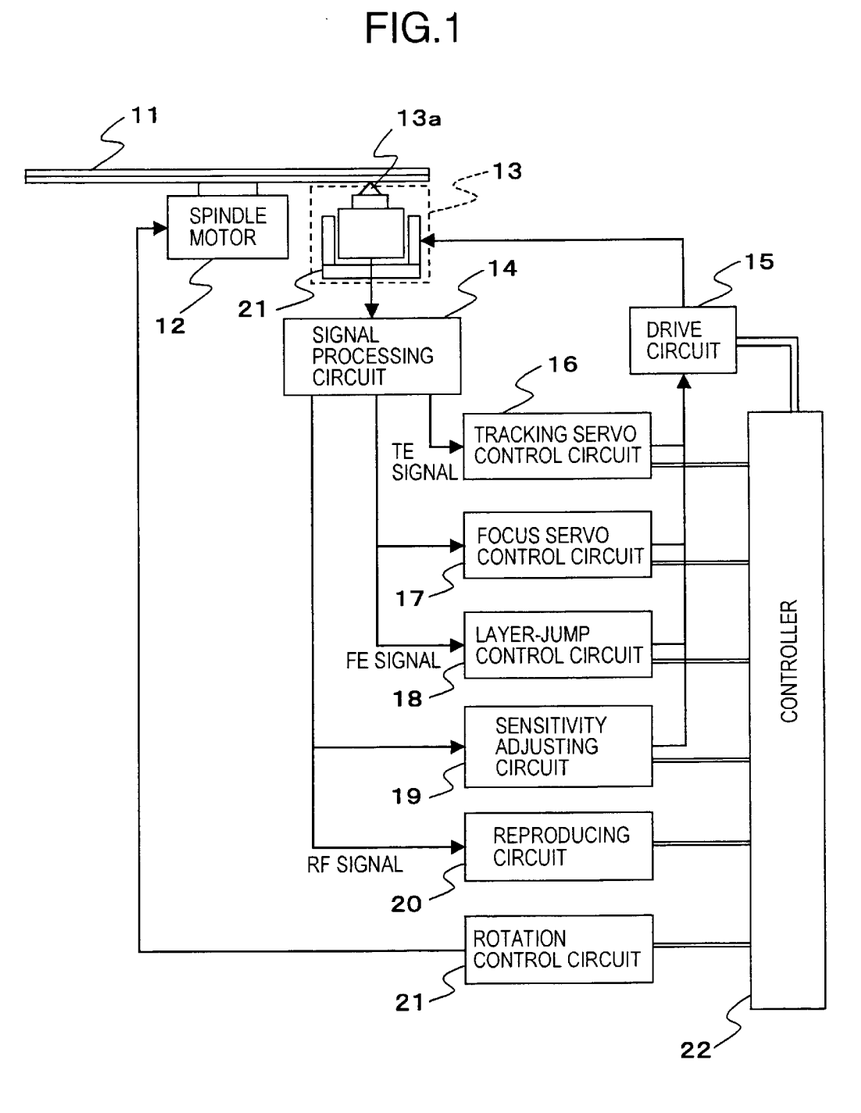
FIG. 1 is a block diagram illustrating an optical disk apparatus of the present invention.

Description will be made on an embodiment of the present invention referring to the drawings. FIG. 1 is a block diagram illustrating a constitution of an optical disk apparatus of the present invention, which reproduces a multi-layer recording optical disk.

As shown in the drawing, the optical disk apparatus includes a spindle motor 12, an optical pickup 13, a signal processing circuit 14, a drive circuit 15, a tracking servo control circuit 16, a focus servo control circuit 17, a layer-jump control circuit 18, a sensitivity adjusting circuit 19, reproducing circuit 20, a rotation control circuit 21, and a controller 22. In the embodiment of the present invention, description of a mechanism, a control circuit and the like for moving the optical pickup 13 in a tracking direction is omitted in order to mainly explain a control of movement of the optical pickup 13 in a focusing direction.

This optical disk apparatus rotates an optical disk 11, such as a DVD-ROM having a multi-layer recording structure by use of the spindle motor 12, based on a rotational speed control signal from the rotation control circuit 21. Then a laser beam is emitted from the optical pickup 13 and converged on a recording layer of the optical disk 11 by the objective lens 13a. The light reflected on the recording layer is read by the optical pickup 13 (scanning). An optical signal read is converted to electric signals such as a tracking error signal (TE signal), a focus error signal (FE signal) and a reflected light quantity signal (RF signal) in the signal processing circuit 14. Herein, the FE signal, the RF signal and the TE signal can be generated, for example, by providing an optical detecting element divided into four parts in a light receiving unit of the optical pickup 13 and amplifying a difference or a sum of outputs of the upper and lower, or the left and right parts of the optical detecting element by use of an astigmatism method.

The optical pickup 13 is provided with an actuator 21 for driving the objective lens 13a in the focusing direction and in the tracking direction (in the radial direction of the optical disk 11). The actuator 21 is independently controlled with respect to the focusing direction and the tracking direction by a control signal from the drive circuit 15.

The TE signal is inputted to the tracking servo control circuit 16. The tracking servo control circuit 16 generates a signal for driving the actuator 21 in the tracking direction based on the TE signal so that a laser beam may follow a track deflection, and outputs the generated signal to the drive circuit 15.

The FE signal is inputted to the focus servo control circuit 17 and the layer-jump control circuit 18. The focus servo control circuit 17 generates a signal for driving the actuator 21 in the focusing direction based on the FE signal so that a laser beam passing through the objective lens 13a may be converged on the recording layer of the optical disk 11, and outputs the generated signal for driving the actuator 21 to the drive circuit 15. On receiving a demand for layer jumping from the controller 22 as described later, the layer-jump control circuit 18 makes the drive circuit 15 generate a kick voltage for moving a focal point of the objective lens 13a to a target layer. The layer-jump control circuit 18 monitors the FE signal, and makes the drive circuit 15 generate a brake voltage for stopping movement of the objective lens 13a on detecting the focal point of the objective lens 13a coming close to the target layer. Note that the signals (the kick signal and the brake signal) generated by the drive circuit 15 may be signals determined in accordance with electric current or the like as well as the voltage signal.

The RF signal is inputted into the sensitivity adjusting circuit 19 and the reproducing circuit 20. The sensitivity adjusting circuit 19 detects the RF signals from the surface and the recording layer of the optical disk 11 by moving the objective lens 13a in the focusing direction, and measures the sensitivity of the actuator 21. In accordance with the measured sensitivity, the sensitivity adjusting circuit 19 adjusts the kick voltage and the brake voltage to be applied to a coil of the actuator 21 by the drive circuit 15 during layer jumping. The reproducing circuit 20 conducts a predetermined demodulation and then an error correction for data read in accordance with the RF signal. The digital signal obtained is subjected to a process such as analog conversion to reproduce audio data, video data or the like.

The controller 22 of the optical disk apparatus controls each process, described above, in the drive circuit 15, the tracking servo control circuit 16, the focus servo control circuit 17, the layer-jump control circuit 18, the sensitivity adjusting circuit 19, the reproducing circuit 20, or the rotation control circuit 21. For example, when the controller 22 receives the demand for layer jumping through the control signal from the reproducing circuit 20 while reproducing the optical disk 11, the controller 22 sends a command for switching the focus servo to the OFF status to the focus servo control circuit 17 and also sends a command for layer jumping to the layer-jump control circuit 18. Upon termination of layer jumping from the layer-jump control circuit 18, the controller 22 sends a command for switching the focus servo to the ON status to the focus servo control circuit 17 and restarts reading the data of the optical disk 11 by use of the reproducing circuit 20.

Figure 2:
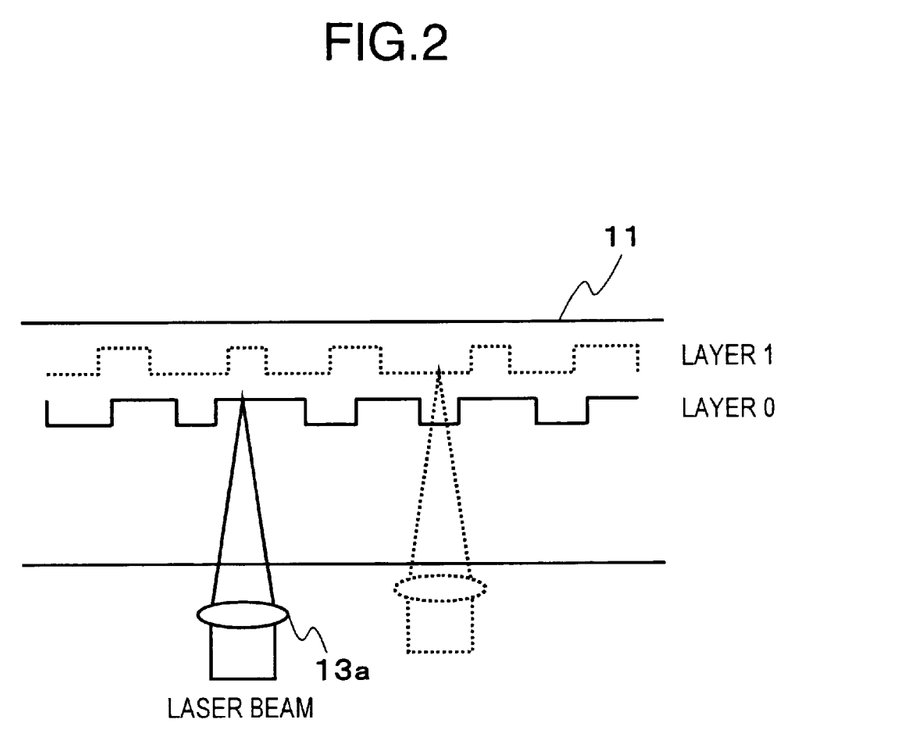
FIG. 2 is an explanation diagram illustrating a constitution of a multi-layer recording optical disk.

In this embodiment, the multi-layer recording optical disk 11 has, as shown in FIG. 2, a two-layer structure with two recording layers. A layer close to the objective lens 13a is called a layer 0, and a layer far from the objective lens 13a is called a layer 1 in the two recording layers. In the drawing, the recording layer represented by a solid line is the layer 0, and the recording layer represented by a dashed line is the layer 1. The external dimensions of the multi-layer recording optical disk are, for example, set to have a diameter of 120 mm and a thickness of 1.2 mm like the CD-ROM. However, the DVD-ROM has a structure, in which two disks, each having a thickness of 0.6 mm, are laminated with each other. Two layers are recordable at a maximum on each surface. The storage capacity is 4.7 GB in recording on one layer on one surface; 8.5 GB in recording on two layers on one surface; 9.4 GB in recording on one layer on both surface; and 17 GB in recording on two layers on both surface. The track pitch is 0.74 $\mu$m and the wavelength of a data reading laser beam is 650 nm. The optical disk apparatus of the present invention can reproduce another optical disk having three or more layers. Further, the optical disk apparatus can reproduce the CD-ROM or the like, which are different from the DVD-ROM in the track pitch, the wave length of the data-reading laser beam, an encoding method, or the like.

A substrate of the optical disk 11 mainly employs polycarbonate resin, which is high in optical transmissivity and has characteristics of high impact resistance, high heat resistance, and high moisture proof. On the recording layer, having pits provided on the substrate, formed is a reflective film by depositing aluminum or the like. The reflectivity of the reflective film is, for example, approximately 80%. Furthermore, the reflective film is also provided with a protective film made from polycarbonate resin thereon.

The surface of the signal reading side of the optical disk 11 has, for example, a reflectivity of approximately 4%. Accordingly, the RF signal, which is obtained from the optical disk 11 when the optical pickup 13 is moved in the focusing direction, is amplified and observed, so that a small peak of the reflected light in the case when the surface of the optical disk 11 is in focus and a large peak of the reflected light in the case when the recording layer is in focus can be distinctively detected.

Figure 3:
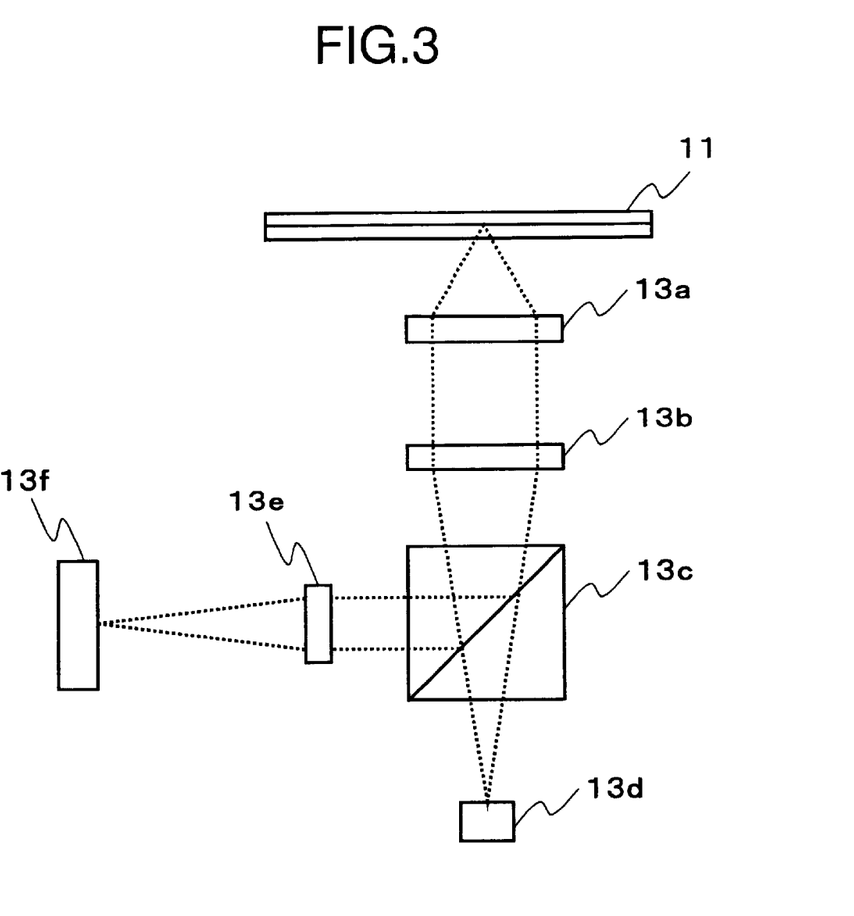
FIG. 3 is an optical path diagram illustrating a constitution of an optical pickup.

The optical pickup 13 reads the data from the optical disk 11. An optical system of the optical pickup 13 includes, for example, as shown in FIG. 3, the objective lens 13a, a collimating lens 13b, a polarizing prism 13c, a semiconductor laser oscillator 13d, a cylindrical lens 13e, and an optical detecting element 13f. The laser beam emitted from the semiconductor laser oscillator 13d travels straight in the polarizing prism 13c, passed through the collimating lens 13b, and converged on any one of the recording layers of the optical disk 11 by the objective lens 13a. The reflected light from the optical disk 11 travels back in the objective lens 13a, and is passed through the collimating lens 13b. Thereafter, the reflected light is bent at a right angle by the polarizing prism 13c, and is made incident into the optical detecting element 13f through a cylindrical lens 13e.

Figure 4:
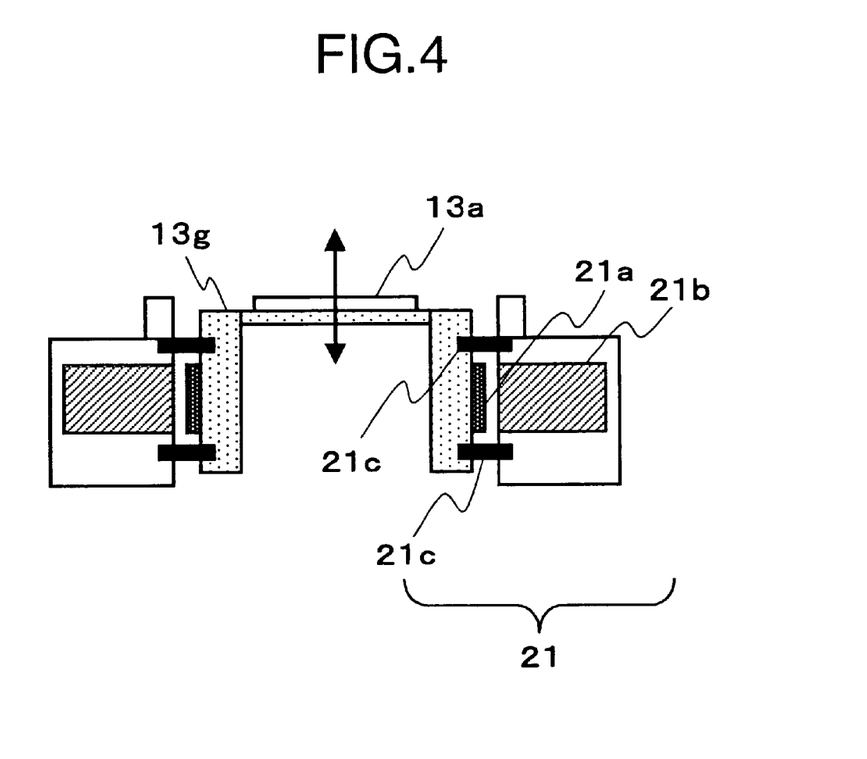
FIG. 4 is a sectional view showing a constitution of a mechanism in which an objective lens is driven in a focusing direction by a biaxial actuator.

FIG. 4 is a diagram illustrating a mechanism in which the objective lens 13a is driven in the focusing direction by the actuator 21. The objective lens 13a is supported by objective lens supporting springs 21c through an objective lens holder 13g so as to be displaced vertically and horizontally. The circumference of the objective lens 13a is provided with a coil 21a for focusing. In addition, magnets 21b are provided on the outside of the coil 21a for focusing. When control voltages (the kick voltage, the brake voltage) are applied to the coil 21a for focusing, the objective lens 13a is given a driving force in the focusing direction as indicated by an arrow in accordance with the voltage direction.

Figure 5:
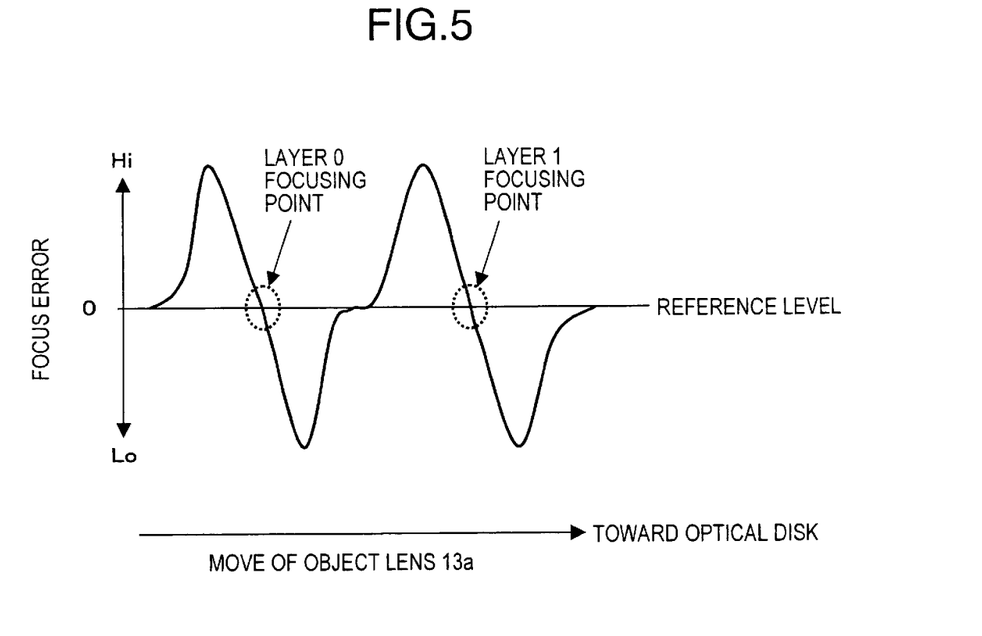
FIG. 5 is a diagram illustrating an example of a focus error signal when an objective lens is moved from a distant position to a position close to the two-layer optical recording disk.

FIG. 5 is a diagram illustrating an example of a waveform of an FE signal while the objective lens 13a is moved close to the optical disk 11 from a distant position. In the drawing, "a layer 0 focusing point" indicated by an arrow shows a position of a focusing point of the layer close to the objective lens 13a (layer 0), and "a layer 1 focusing point" shows a position of a focusing point of the layer far from the objective lens 13a (layer 1). Hi and Lo show upward and downward directions with reference to FE signal voltage 0.

In the drawing, the FE signal first forms a peak in the Hi direction when the objective lens 13a is started to move from a distant position toward the optical disk 11, and reaches a reference level at a position, thus providing the focusing point of the layer 0 in the vicinity thereof. Thereafter, the FE signal forms a peak in the Lo direction and passes again through the reference level to form a peak in the Hi direction. Then the FE signal reaches the reference level again at a position, thus providing the focusing point of the layer 1 in the vicinity thereof. When the objective lens 13a is moved further close to the optical disk, the FE signal again forms a peak in the Lo direction.

Next, description will be made on the sensitivity of the actuator 21 in the focusing direction.

The sensitivity A of the actuator 21 in the focusing direction is generally shown in the following formula, when the objective lens 13a is moved at a low speed in the focusing direction:

$$A = d/(n \times t_{sr} \times V_{sr}) [\text{mm/V}]$$

In this formula, d represents a thickness [mm] between the surface and the recording layer of the optical disk 11; n represents a refractive index of the disk material; $t_{sr}$ represents a time [sec] between a reflection on a surface and a reflection on the recording layer; $V_{sr}$ represents a voltage fluctuation [V/sec] per a unit time, which is applied to the coil 21a for focusing of the actuator 21.

Figure 6:
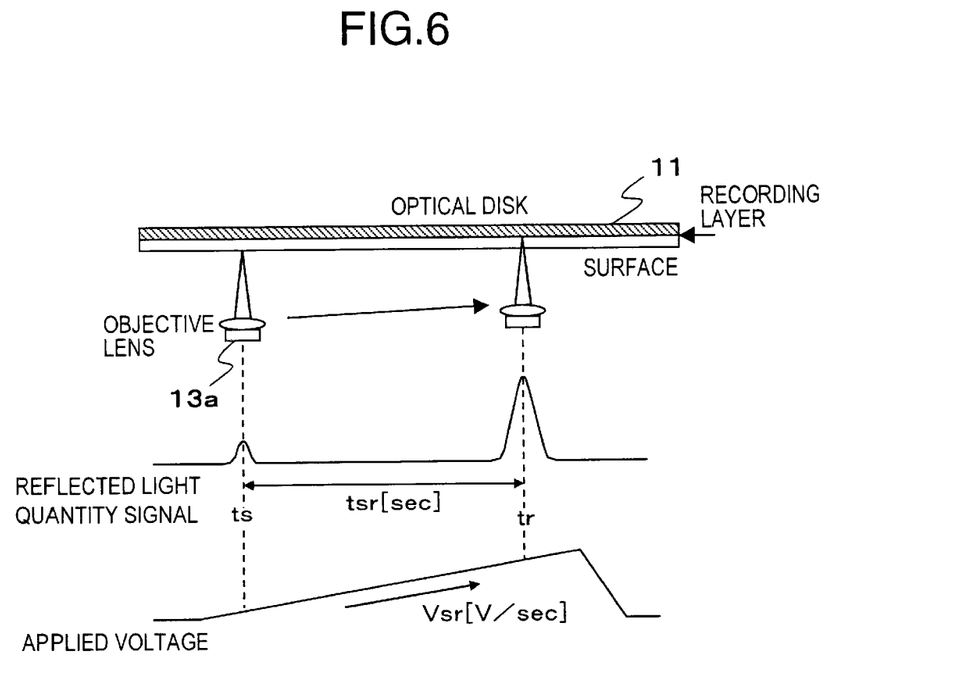
FIG. 6 is a schematic diagram illustrating an example of a relation among a position of the objective lens, a reflected light quantity signal, and a voltage applied.

FIG. 6 is a diagram schematically illustrating a relation among the position of the objective lens 13a when being moved in the focusing direction at a low speed, the RF signal, and the voltage to be applied to the coil 21a for focusing of the actuator 21. As shown in the drawing, when the objective lens 13a is moved close to the optical disk 11 at a low speed by applying a voltage of $V_{sr}$ [V/sec] to the coil 21a for focusing of the actuator 21, the RF signal forms a small peak when a focal point of the objective lens 13a reaches the surface of the optical disk 11. Such time is represented by $t_s$. When the objective lens 13a is moved further close to the optical disk 11 and the focal point of the objective lens 13a reaches the recording layer of the optical disk 11, the RF signal forms a large peak. Such time is represented by $t_r$. A time period between $t_s$ and $t_r$ is a time period $t_{sr}$ between the refection on the surface and the reflection on the recording layer.

Generally, when the objective lens 13a is moved in the focusing direction at a high speed (at a frequency f [Hz] not lower than a primary resonance frequency f0 [Hz] of the actuator) in the optical pickup 13, a sensitivity B of the actuator 21 in the focusing direction is shown by the following formula:

$$B = \{\text{low speed sensitivity}\} A \times (f0/f)^2 [\text{mm/V}]$$

In the above formulae showing the [high speed] sensitivity B and the sensitivity A, the parameters except $t_{sr}$ [s] may be substantially fixed. Thus the high speed sensitivity of the actuator 21 is considered to be a value in accordance with $t_{sr}$, which is obtained when the objective lens 13a is moved at a low speed. In other words, a dispersion of the high speed sensitivity of the actuator 21 can be determined as a dispersion of the time period $t_{sr}$ between the reflection on the surface and the reflection of the recording layer. In addition, a high speed sensitivity of the actuator 21 causes a problem during layer jumping, in which the objective lens 13a is moved at a high speed.

Thus it is preferable to control the optical pickup 13 in accordance with $t_{sr}$ in order to adjust the dispersion of the actuator 21 in the focusing direction during layer jumping. Specifically, if $t_{sr}$ is relatively small, the high speed sensitivity of the actuator 21 is high, so that an integral value of the applied voltage for the time period of applying the voltage should be made small. On the other hand, if $t_{sr}$ is large, the sensitivity of the actuator 21 is relatively low, so that the integral value of the applied voltage for the time period of applying the voltage should be made large. Thus, layer jumping in which the sensitivity dispersion of the actuator 21 has been adjusted can be conducted.

For this reason, in the optical disk apparatus of the present invention, prior to reproducing an optical disk, for instance, in insertion of an optical disk, in receiving a start command of reproduction from users, or in first insertion of an optical disk after a power is turned on, the objective lens 13a is moved in the focusing direction at a low speed. The sensitivity adjusting circuit 19, as previously described, measures the time period $t_{sr}$ [sec] between the reflection on the surface and the reflection on the recording layer based on the RF signal from the optical disk 11.

For instance, an optical disk apparatus capable of reproducing the DVD-ROM and the CD-ROM may use the time period $t_{sr}$ between the reflection on the surface and the reflection on the recording layer to discriminate the kind of disk media. Specifically, the DVD-ROM and the CD-ROM have the same thickness of 1.2 mm, but have a difference in the distance between the surface and the recording layer of the optical disk. In some types of the optical disk apparatus, such difference is used to measure $t_{sr}$ when the optical disk is inserted or at other time. The optical disk apparatus judges that the inserted disk medium is the CD-ROM if $t_{sr}$ is not less than a predetermined value; otherwise the inserted disk medium is the DVD-ROM.

In the optical disk apparatus carrying out such process of judgment, the sensitivity adjusting of the actuator 21 can be conducted based on $t_{sr}$ measured in the process of discrimination of the disk media.

Next, description will be made on an example of a process during layer jumping in the optical disk apparatus of the present invention based on $t_{sr}$ measured.

Figure 7A:
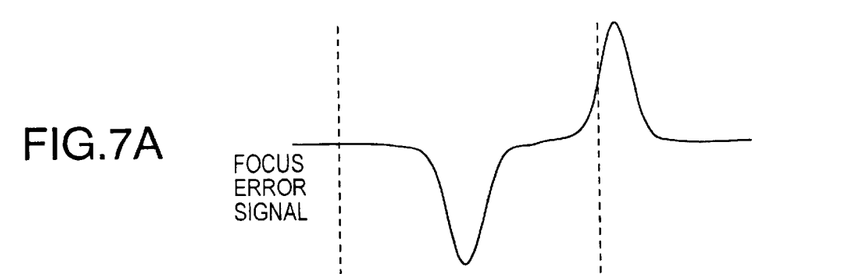
FIGS. 7A to 7D are diagrams illustrating a relation between a focus error signal and the voltage applied.
Figure 7B:
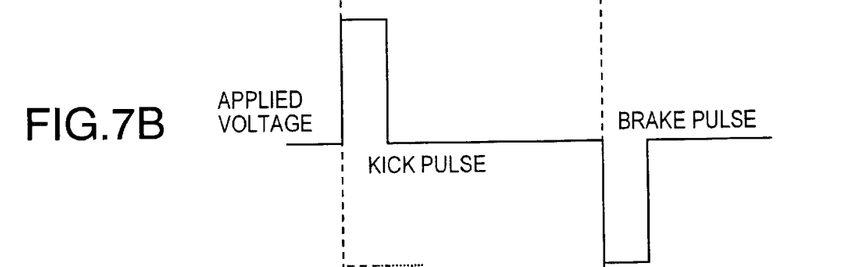
Figure 7C:
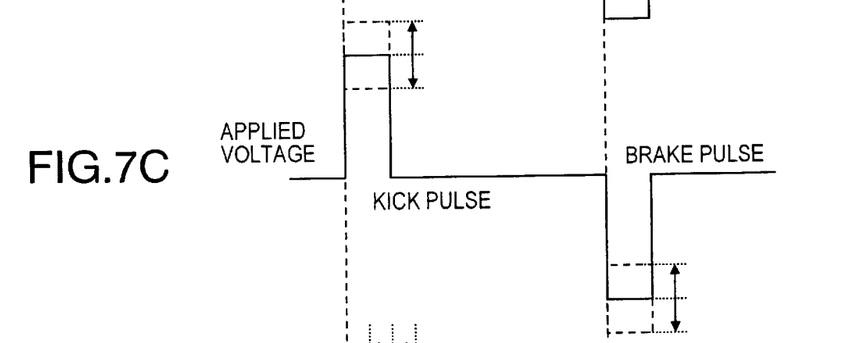
Figure 7D:
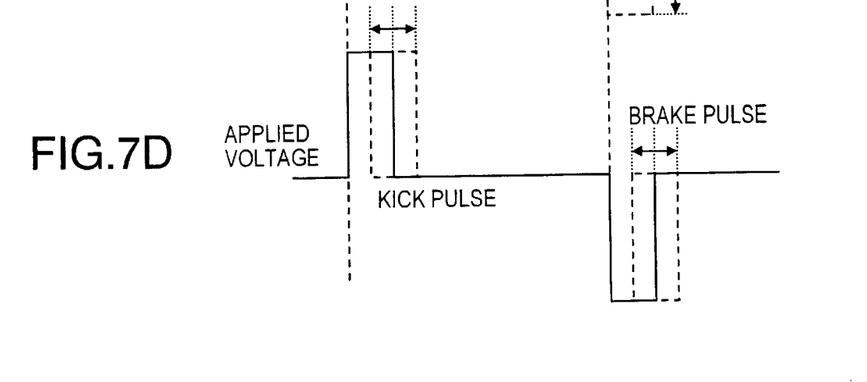

The drive circuit 15 applies the kick voltage and the brake voltage to the coil 21a for focusing of the actuator 21 so as to move the objective lens 13a by a distance of the recording layers during layer jumping. FIG. 7A shows an FE signal during layer jumping; FIGS. 7B to 7D are diagrams, each showing a voltage applied to the coil 21a for focusing. As shown in FIGS. 7A and 7B, the layer-jump control circuit 18 makes the drive circuit 15 generate a kick pulse to start movement of the objective lens 13a. Then the layer-jump control circuit 18 monitors the FE signal. On detecting the FE signal which has reached a predetermined value, the layer-jump control circuit 18 makes the drive circuit 15 generate a brake pulse of an opposite polarity to that of the kick pulse, and stops movement of the objective lens 13a.

As shown in FIG. 7B, each of the kick pulse and the brake pulse has a predetermined voltage value and a predetermined pulse width. Thus, by changing either the voltage value or the pulse width, alternatively both thereof, a drive force and a brake force to be applied to the objective lens 13a can be adjusted. In other words, the sensitivity adjusting of the actuator 21 can be conducted by changing the voltage value and the pulse width based on $t_{sr}$ measured.

FIG. 7C illustrates an example in which the sensitivity is adjusted by changing the voltage value of the pulse. If $t_{sr}$ measured is relatively small, the sensitivity of the actuator 21 is adjusted by decreasing the pulse voltage. On the other hand, if $t_{sr}$ measured is relatively large, the sensitivity of the actuator 21 is adjusted by increasing the pulse voltage.

As the method of calculating the voltage value in this case, the following method can be employed, for example. The sensitivity adjusting circuit 19 stores an average time period $t_{std}$ [sec] between the reflection on the surface and the reflection on the recording layer, and an average pulse voltage value $V_{std}$ [V] in advance. For instance, such average values can be calculated experimentally or theoretically. When $t_{sr}$ is measured, the sensitivity adjusting circuit 19 calculates $V_h$ by the following formula:

$$V_h = V_{std} \times t_{sr}/t_{std} [V],$$

and informs the drive circuit 15 of setting this $V_h$ [V] as a pulse voltage value to be applied to the coil 21a for focusing of the actuator 21 during layer jumping. When the drive circuit 15 receives a command for applying the kick voltage and the brake voltage from the layer-jump control circuit 18, the pulse voltage of $V_h$ [V] is applied to the coil 21a for focusing of the actuator 21. Accordingly, the objective lens 13a is controlled in accordance with the sensitivity of the actuator 21, so that layer jumping in which the sensitivity dispersion has been adjusted can be conducted.

The calculation of the pulse voltage value $V_h$ [V] is not limited to the above formula. For instance, parameters α and β in accordance with characteristics of the actuator may be experimentally obtained and given to the following formula to calculate $V_h$:

$$V_h = \alpha + (V_{std} - \beta) \times t_{sr}/t_{std} [V]$$

FIG. 7D shows an example in which the sensitivity adjustment is made by changing the pulse width (time period of applying a voltage). If $t_{sr}$ measured is relatively small, the sensitivity of the actuator 21 is adjusted by decreasing the pulse width. On the other hand, if $t_{sr}$ measured is relatively large, the sensitivity of the actuator 21 is adjusted by increasing the pulse width.

As a method of calculating the pulse width in this case, the following method, for example, can be employed. The sensitivity adjusting circuit 19 stores an average time period $t_{std}$ [sec] between the reflection on the surface and the reflection on the recording layer, and an average pulse width $P_{std}$ [sec] in advance. For instance, such average values can be calculated experimentally or theoretically. When $t_{sr}$ is measured, the sensitivity adjusting circuit 19 calculates $P_w$ by the following formula:

$$P_w = P_{std} \times t_{sr}/t_{std} [sec],$$

and informs the drive circuit 15 of setting this $P_w$ [sec] as a width of the pulse to be applied to the coil 21a for focusing of the actuator 21 during layer jumping. When the drive circuit 15 receives a command for applying the kick voltage and the brake voltage from the layer-jump control circuit 18, this pulse voltage having a width of $P_w$ [sec] is applied to the coil 21a for focusing of the actuator 21. Accordingly, the objective lens 13a is controlled in accordance with the sensitivity of the actuator 21, so that layer jumping in which the sensitivity dispersion has been adjusted can be conducted.

The calculation of the pulse width $P_w$ [sec] is not limited to the above formula, and, for instance, parameters γ and δ in accordance with characteristics of the actuator may be obtained experimentally and used in the following formula to calculate $P_w$:

$$P_w = \gamma + (P_{std} - \delta) \times t_{sr}/t_{std} [sec]$$

The pulse voltage value $V_h$ [V] and the pulse width $P_w$ [sec] are proper values in accordance with $t_{sr}$ are not necessary to be defined by the formula. Such values in accordance with $t_{sr}$ may be selected among a plurality of predetermined values by using tables or the like.

Both of the voltage value and the width of the pulse can be changed. Even when a voltage to be applied to the coil of the actuator 21 is not shaped in a pulse waveform, the present invention can be applied to the optical disk apparatus. In other words, it is necessary only that an integral value of a voltage to be applied is in accordance with $t_{sr}$ measured. For instance, when a voltage having a triangle waveform is applied to the coil, the integral value of the voltage can be adjusted by changing a height or a width of the triangle waveform. Furthermore, the voltage value, the pulse width, and the like are calculated by use of the parameters different in the kick voltage and the brake voltage by considering the characteristics of the actuator, the gravity direction and the like.

Each process of the above optical disk apparatus can be controlled based on, for example, programs such as a driver, firmware, or the like. Such programs can be stored in a storage unit equipped in the optical disk apparatus. Alternatively, a program for control can be stored in a recording medium such as an optical disk and read into the optical disk apparatus when necessary.

The layer jumping control according to the present invention can, of course, be applied to an optical disk with a structure of three layers or more as well as an optical disk with a two-layer structure. Moreover, the layer jumping control can be applied to not only a reproducing apparatus but also a recording apparatus.

As described above, according to the present invention, the sensitivity dispersion of the actuator of the optical pickup during layer jumping can be adjusted.

What is claimed is:

1. A method of controlling movement of an objective lens in an optical disk apparatus, comprising the steps of measuring a time for moving a focal point of said objective lens between a surface and a recording layer of an optical disk by moving said objective lens for converging a laser beam in a focusing direction to observe a reflected light from said optical disk while emitting said laser beam to said optical disk; and moving said objective lens by use of a first signal for driving said objective lens toward a recording layer on which the laser beam is to be converged and a second signal for braking said objective lens, when the recording layer on which the laser beam is to be converged is required to be changed at the time of scanning a multi-layer recording optical disk, said first and second signals being separately defined based on a ratio of said measured time and a predetermined reference time.

2. The method of controlling movement of an objective lens according to claim 1, wherein said first signal and said second signal are represented by pulse voltage and the value of the pulse voltage is determined in accordance with the ratio of said measured time to the predetermined reference time.

3. The method of controlling movement of an objective lens according to claim 1, wherein said first signal and said second signal are represented by pulse voltage and the width of the pulse voltage is determined in accordance with the ratio of said measured time to the predetermined reference time.

4. The method of controlling movement of an objective lens according to claim 1, wherein the time for moving a focal point of said objective lens between the surface and the recording layer of the optical disk is measured in a process of identifying a kind of the optical disk.

5. The method of controlling movement of an objective lens according to claim 2, wherein the time for moving a focal point of said objective lens between the surface and the recording layer of the optical disk is measured in a process of identifying a kind of the optical disk.

6. The method of controlling movement of an objective lens according to claim 3, wherein the time for moving a focal point of said objective lens between the surface and the recording layer of the optical disk is measured in a process of identifying a kind of the optical disk.

7. An optical disk apparatus of driving a multi-layer recording optical disk, comprising:

means of measuring a time for moving a focal point of an objective lens between a surface and a recording layer of an optical disk by moving said objective lens for converging a laser beam in a focusing direction to observe a reflected light from said optical disk while emitting said laser beam to said optical disk; and controlling means for moving said objective lens by use of a first signal for driving said objective lens toward a recording layer on which the laser beam is to be converged and a second signal for braking said objective lens, when the recording layer on which the laser beam is to be converged is required to be changed at the time of scanning the optical disk, said first and second signals being separately defined based on a ratio of said measured time and a predetermined reference time.

8. The optical disk apparatus according to claim 7, wherein said first signal and said second signal are represented by pulse voltage and the value of the pulse voltage is determined in accordance with the ratio of said measured time to the predetermined reference time.

9. The optical disk apparatus according to claim 7, wherein said first signal and said second are represented by pulse voltage and the width of the pulse voltage is determined in accordance with the ratio of said measured time to the predetermined reference time.

10. The optical disk apparatus according to claim 7, further comprising:

means for reproducing a plurality of optical disk media different in standard, wherein the time for moving a focal point of said objective lens between the surface and the recording layer of the optical disk is measured in a process of identifying a kind of the optical disk.

11. The optical disk apparatus according to claim 8, further comprising:

means for reproducing a plurality of optical disk media different in standard, wherein the time for moving a focal point of said objective lens between the surface and the recording layer of the optical disk is measured in a process of identifying a kind of the optical disk.

12. The optical disk apparatus according to any one of claim 9, further comprising:

means for reproducing a plurality of optical disk media different in standard, wherein the time for moving a focal point of said objective lens between the surface and the recording layer of the optical disk is measured in a process of identifying a kind of the optical disk.

13. A recording medium having a program recorded thereon for controlling an optical disk apparatus driving a multi-layer recording optical disk, the program causing the optical disk apparatus to conduct:

a procedure of measuring a time for moving a focal point of an objective lens between a surface and a recording layer of an optical disk by moving said objective lens for converging a laser beam in a focusing direction to observe a reflected light from said optical disk while emitting said laser beam to said optical disk; and a control procedure of movement of an objective lens for moving said objective lens by use of a first signal for driving said objective lens toward a recording layer on which the laser beam is to be converged and a second signal for braking said objective lens, when the recording layer on which the laser beam is to be converged is required to be changed at the time of scanning the optical disk, said first and second signals being separately defined based on a ratio of said measured time and a predetermined reference time.

* * * * *